(12) United States Patent
French et al.

(10) Patent No.: US 7,648,102 B2
(45) Date of Patent: Jan. 19, 2010

(54) BALLOONSONDE LAUNCHER

(75) Inventors: Patrick French, Aurora, CO (US); Bradley D. Veatch, Westminster, CO (US); Michael O'Connor, Centennial, CO (US); Joseph D. Scott, Centennial, CO (US); Blase A. Yamona, Lakewood, CO (US)

(73) Assignee: ADA Technologies, Inc., Littleton, CO (US)

( * ) Notice: Subject to any disclaimer, the term of this patent is extended or adjusted under 35 U.S.C. 154(b) by 32 days.

(21) Appl. No.: 11/743,019

(22) Filed: May 1, 2007

(65) Prior Publication Data

US 2007/0199503 A1 Aug. 30, 2007

Related U.S. Application Data

(62) Division of application No. 10/821,799, filed on Apr. 9, 2004, now Pat. No. 7,275,496.

(60) Provisional application No. 60/462,363, filed on Apr. 11, 2003.

(51) Int. Cl.
*B64B 1/40* (2006.01)
(52) U.S. Cl. .................................................. 244/31
(58) Field of Classification Search .............. 244/33, 244/31; 446/220, 221, 224; 441/30, 9; 116/DIG. 8, 116/DIG. 9, 210
See application file for complete search history.

(56) References Cited

U.S. PATENT DOCUMENTS

| | | | |
|---|---|---|---|
| 2,409,166 A | 10/1946 | Tracy et al. | |
| 2,778,332 A | 1/1957 | Thomas | |
| 3,195,835 A | 7/1965 | Eyre et al. | |
| 3,487,810 A | 1/1970 | Clement | |
| 3,657,752 A | 4/1972 | Davidson et al. | |
| 4,903,958 A | 2/1990 | DiCarlo et al. | |
| 5,277,373 A | 1/1994 | Morton | |
| 5,636,480 A * | 6/1997 | Lauritsen et al. | ............... 52/66 |
| 5,884,862 A * | 3/1999 | Aurilio et al. | ............. 244/1 TD |
| 5,895,010 A * | 4/1999 | Aurilio et al. | ............. 244/1 TD |
| 5,901,922 A * | 5/1999 | Aurilio et al. | ............. 244/1 TD |
| 6,373,384 B1 | 4/2002 | Ferguson et al. | |
| 6,477,979 B1 | 11/2002 | Sanchez | |

OTHER PUBLICATIONS

Vaisala ASAP Station Product Literature, www.vaisala.com; 2 pgs.
Providing Cutting-Edge Weather Support in Piemonte, Vaisala news, 161/2003, p. 10, www.vaisala.com; 1 pg.
The Impact of Automated Shipboard Aerological Program (ASAP) Data Upon Australian Analyses, Vaisala News, 162/2003, pp. 8-9; www.vaisala.com; 2 pgs.

(Continued)

*Primary Examiner*—Tien Dinh
(74) *Attorney, Agent, or Firm*—Sheridan Ross P.C.

(57) ABSTRACT

An automated balloonsonde launcher and a method for an automated balloonsonde launch are disclosed. The automated balloonsonde launcher, for example, may comprise a collapsible protective cover forming an inner region for receiving a balloon, a gas inlet for receiving a gas, a gas outlet for mating with a balloon, a valve operable between the gas inlet and the gas outlet for inflating a balloon within the inner region of the protective cover. The launcher further comprises a controller that controls the valve to inflate a balloon within the protective cover, opens an opening in the protective cover and releases a balloon through the opening of the protective cover.

28 Claims, 17 Drawing Sheets

OTHER PUBLICATIONS

Yankee Environmental Systems, Inc. Automated Radiosonde Launcher Model ARL-9000, Bulletin ARL-9000, www.yesinc.com, 6 pgs.
Vaisala Balloon Launchers FB15 and FB16A Product Description, www.vaisala.com, 2 pgs.
Bureau of Meteorology Annual Report 2000-2001, Meteorological and Related Data and Products website, pp. 1-23.
International Search Report for counterpart PCT application, dated May 24, 2006.
Written Opinion of the International Searching Authority for counterpart PCT application, dated May 24, 2006.
International Preliminary Report on Patentability for International (PCT) Patent Application No. PCT/US2004/011014, issued Jul. 10, 2006.

* cited by examiner

*Fig. 9D*  *Fig. 9E*  *Fig. 9F*

BALLOONSONDE LAUNCHER

CROSS-REFERENCE TO RELATED APPLICATIONS

This application is a divisional of U.S. patent application. Ser. No. 10/821,799, entitled "Balloonsonde Launcher" and filed Apr. 9, 2004, by Patrick French, et al., which claims the benefit of U.S. Provisional Patent Application No. 60/462,363, entitled "Distributed Platform Automated Balloonsonde Launcher" and filed by French et al. on Apr. 11, 2003, which is incorporated herein by reference.

FIELD OF THE INVENTION

The present invention is related to an automated balloonsonde launcher.

BACKGROUND OF THE INVENTION

Balloonsondes are small balloon-borne instrument packages used to acquire various atmospheric data. Balloons and sondes, once released, ascend vertically above the earth's surface, collect instrument readings and transmit those readings in a radio signal. Ground-based telemetry receivers monitor and log these transmissions. The receiver, for example, may create a "vertical sounding profile" by compiling data collected as the balloonsonde rises through the atmosphere. Vertical sounding profiles may then be used in atmospheric models, which are becoming increasingly sophisticated. Sondes are considered to be one of the best sources of data for these profiles because they are able to collect information over a large range of altitudes.

Balloonsondes are traditionally launched by hand because the balloon, once inflated with gas, is highly susceptible to puncture or tearing. In addition, large, complex and expensive automated systems for launching balloonsondes have been developed. These systems include a chamber in which the balloon is protected while it is being inflated. The chamber must be large enough to hold a fully-inflated balloon.

SUMMARY OF THE INVENTION

In certain applications, however, it is desirable to minimize the size of the automated balloonsonde launcher system. Where the system is portable, for example, it is desirable to provide an automated balloonsonde launcher system that is small and may be easily moved. Also, where the automated balloonsonde launcher system is to be operated from a location, such as on a commercial ship deck, where the footprint or volume of the launcher system is an issue, it is desirable to provide a system that provides a smaller footprint or volume.

In one embodiment, an automated method of launching a balloon comprises providing a collapsible protective cover comprising a flexible material forming an inner region and a balloon. At least a portion of the balloon is inflated under the direction of a controller within at least a portion of said inner region of said protective cover. When the balloon has been inflated, at least a portion of the protective cover is opened to expose the balloon and the balloon is released through the opening of said inflatable structure.

In another embodiment, a balloon launcher comprises a collapsible protective cover comprising a flexible material forming an inner region, a gas inlet for receiving a gas, a gas outlet for mating with a balloon, a valve operable between the gas inlet and the gas outlet for inflating the balloon with the gas within said inner region of said collapsible protective cover, and a controller. The controller is adapted to control the valve to inflate a balloon within the protective cover, to open an opening in the protective cover and to release a balloon through the opening in the protective cover.

In yet another embodiment, the present invention comprises a distributed platform automated balloonsonde launcher. In this embodiment, the balloonsonde launcher comprises a control module and one or more launch modules linked to the control module. The control module comprises a controller for controlling the launch of a balloon from the launch module. The control module further comprises an inflating gas supply. The launch module comprises a protective cover and a local controller for inflating a balloon at least partially within said protective cover. When the balloon has been inflated, the protective cover is opened, exposing the balloon, and the balloon is released.

In another embodiment, the present invention comprises a portable balloonsonde launcher. In this embodiment, the portable balloonsonde launcher comprises a combined control module and launch module for launching a balloonsonde. The portable balloonsonde launcher comprises a reservoir for storing an inflating gas, a protective cover comprising a flexible material and a balloon located at least partially within the protective cover The portable balloonsonde launcher further comprises a controller for inflating a balloon at least partially within the protective cover, opening at least a portion of the protective cover to expose the balloon and releasing the balloon through the opening of the protective cover.

BRIEF DESCRIPTION OF THE DRAWINGS

FIGS. 9A through 9G show a launch module of the automated balloonsonde launcher of FIG. 1 taken at discrete times during a launch of a balloonsonde;

DETAILED DESCRIPTION

Figure 1:
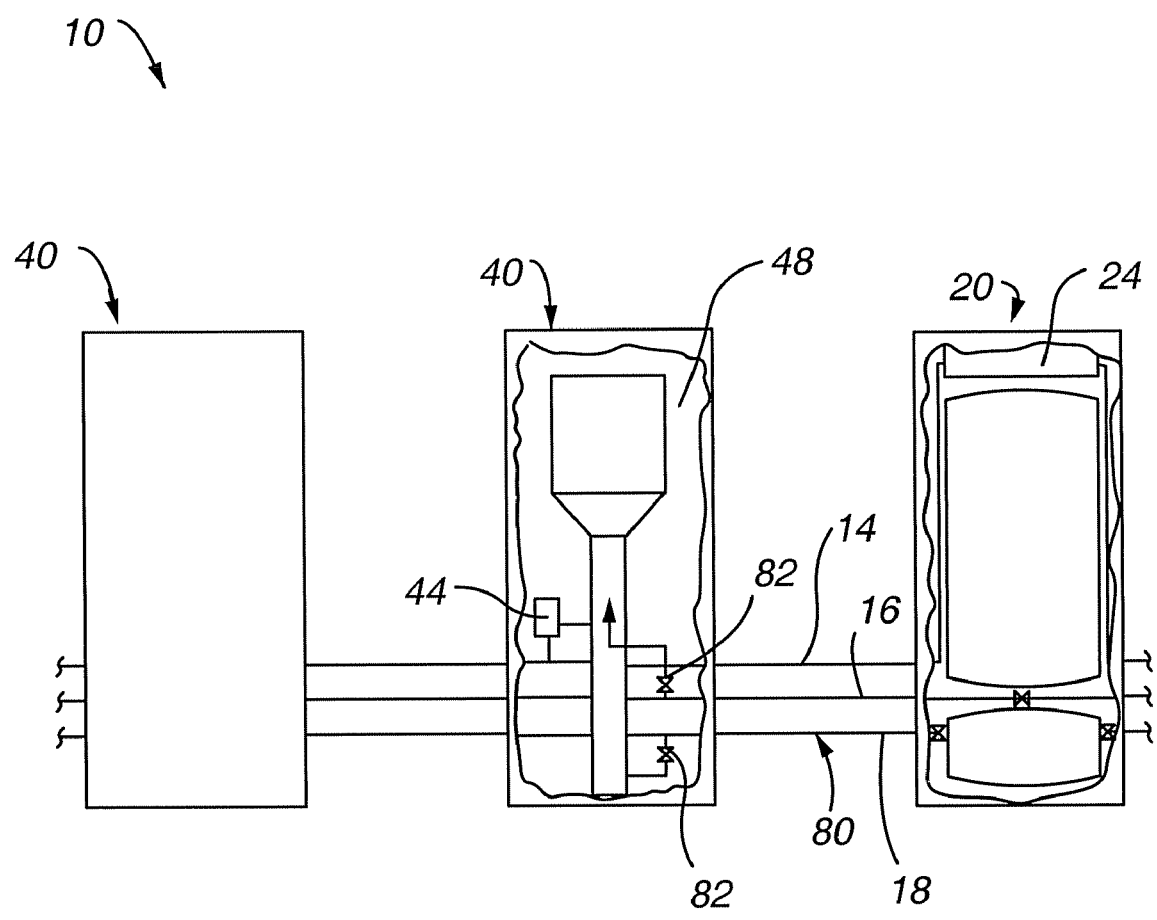
FIG. 1 shows a broken front view of one embodiment of an automated balloonsonde launcher of the present invention.
Figure 2:
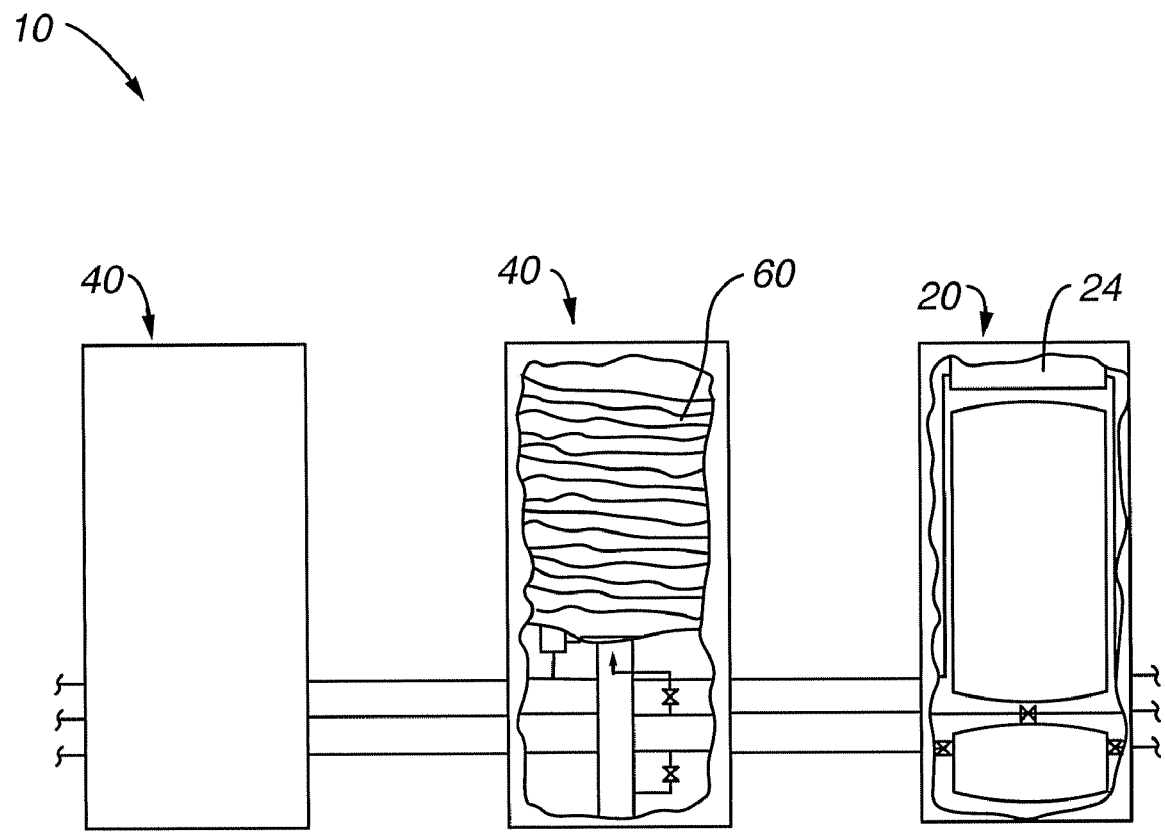
FIG. 2 shows a broken front view of the embodiment of the automated ballonsonde launcher of FIG. 1 with a protective cover loaded in a launch module of the launcher.
Figure 3:
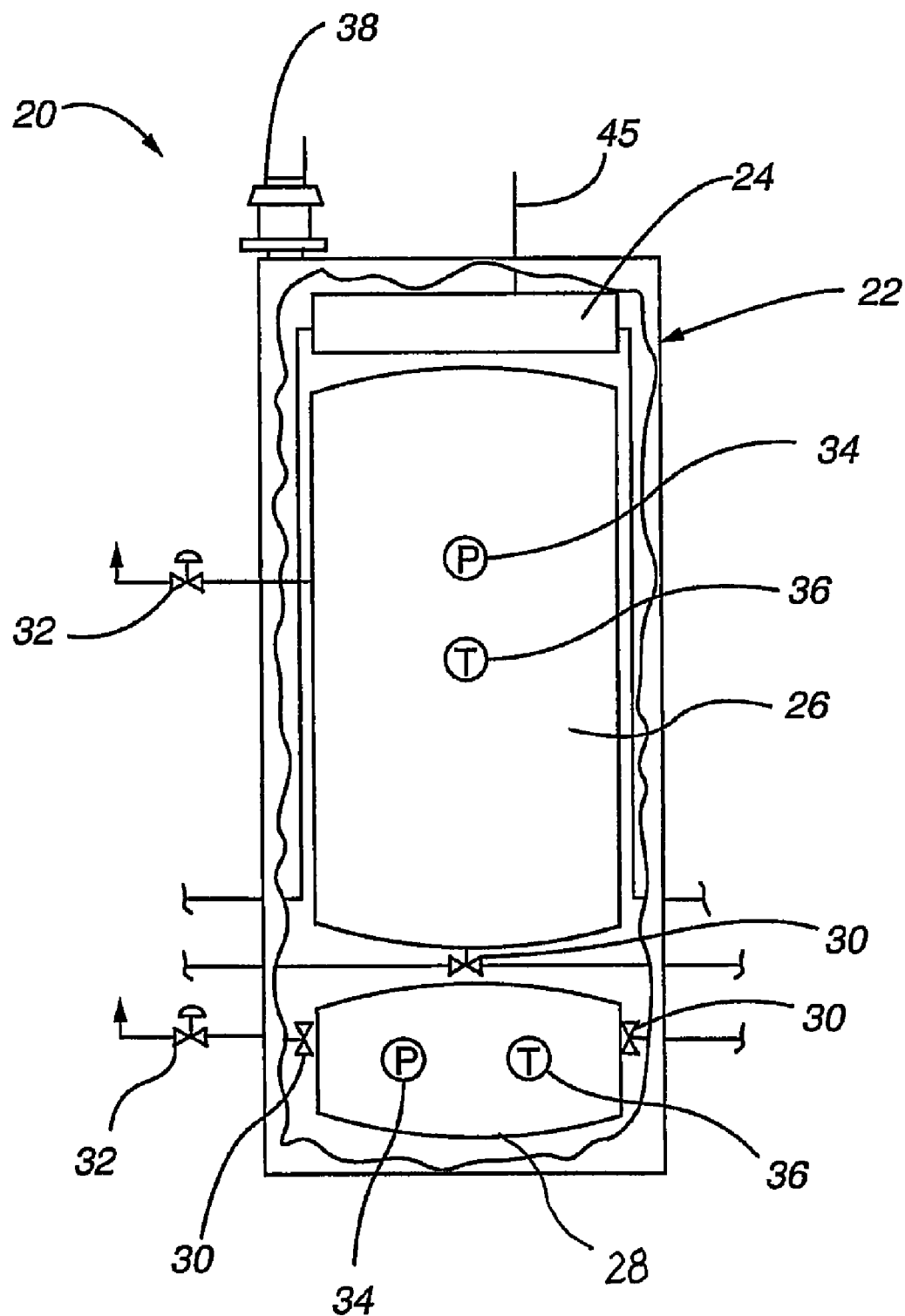
FIG. 3 shows a broken front view of a control module of the automated balloonsonde launcher of FIG. 1.

A first embodiment of a balloonsonde launcher system of the present invention is shown in FIGS. 1 through 3. In this embodiment, the system comprises a distributed platform comprising a control module and one or more launch modules. The control module comprises a balloon inflating gas supply, a protective cover, an inflation gas supply and a controller. The balloon inflation gas supply meters an inflation gas lighter than air (e.g., helium or hydrogen) to a launch module for inflating a balloon. As shown in FIG. 1, the balloon inflation gas supply may comprise a pressure vessel for storing an inflating gas such as helium or may receive the inflation gas from an external gas supply and directly meter the gas to the launch module.

A distributed platform, such as shown in FIGS. 1 and 2, is particularly advantageous where multiple balloonsondes are to be released between service intervals. The distributed platform embodiment of the present invention also allows for increased flexibility because the platform may be specially-designed to a particular application. For example, where the system is installed in an area having limited space (such as on-board a ship), a minimum number of launch modules may be deployed to support a particular data acquisition mission and minimize the footprint required. Alternatively, where the system is to be installed and automatically release multiple balloonsondes between servicing, a distributed platform that will meet these requirements can be designed. Thus, if a system is to release a balloonsonde every day, but the system is preferably only serviced once a week, a distributed platform can be arranged so that the system comprises at least seven launch modules (redundant modules may also be included in the event that one or more modules fail to successfully launch a balloonsonde). When an operator services the modules, the operator installs a new balloon and sonde in each module and prepares the modules for subsequent launches.

In addition, different launch modules in the system may be adapted to launch different-sized balloons and instrument packages from the same launch system. The use of specially-designed launch modules also allows for smaller spaces specially designed for conditioning particular balloons and instruments prior to launch. These reduced-size spaces in the launch modules of the present invention are able to reduce power requirements for conditioning balloons and/or instruments immediately prior to launch instead of providing power to condition a balloon and an instrument in a large structure sized to hold an inflated balloon.

FIG. 3 shows a control module 20 of a distributed balloonsonde launcher system of the present invention. The control module 20 controls the operation of one or more distributed launch modules 40 of the system 10. In one embodiment, the control module is preferably housed in a generally cylindrical housing 22. The housing 22 comprises a generally symmetrical outer profile that minimizes the sensitivity of the control module 20 to winds approaching from different directions. The control module 20 comprises a controller 24 for controlling the operation of the distributed balloonsonde launcher system. The control module further comprises one or more tanks for an inflating gas and/or compressed air and sensors for monitoring the one or more tanks. In the embodiment shown in FIG. 3, for example, the control module comprises an inflating gas tank 26 and a compressed air tank 28. Each tank comprises flow control solenoid valves 30 on the inlet and outlet of the tank, a manual valve 32 to relieve pressure in the tank when taking the unit out of service or transporting it, and sensors such as pressure sensors 34 and temperature sensors 36. The controller 24 of the control module 20 controls the operation of the flow control solenoid valves 30 and monitors the sensors 34 and 36.

An inflating gas tank 26 is preferably sized so that one complete tank, filled to a relatively low pressure (e.g., 80 to 200 p.s.i.), is sufficient to fill one balloon. Thus, the fill time of the tank does not affect the balloon fill time because one fill cycle is sufficient to completely fill the balloon. The controller 24 calculates the necessary tank charging pressure using the sensed temperature of the inflating gas and controls the inlet flow control solenoid valve 30 enough to charge the tank to that pressure.

The compressed air tank 28, where used, provides compressed air to the inflatable extenders 62 to inflate the protective cover 60 (see, e.g., FIGS. 9A through 9G). The compressed air tank 28 preferably comprises a sufficient gas volume to inflate and maintain the inflatable extenders 62 during the launch of a balloon and operates as a buffer for a compressed air supply. In one embodiment, for example, a 4.5 gallon tank provides a sufficient capacity for inflating and maintaining the inflatable extenders 62 during the launch of a balloon. The buffer system of the compressed air tank minimizes the power and compressed air requirements of the control module 20. In applications such as a remote land-based launch, for example, the buffer system allows for the launcher system to utilize a small compressor to charge the tank slowly between launches instead of requiring a compressor with the capacity to inflate and maintain the inflatable extenders for the duration of the launch.

The controller 24 preferably comprises an embedded controller that interfaces directly with the local controllers 44 of the launch modules 40. In the embodiment shown in FIG. 1, for example, the controller communicates with the local controllers 44 of the launch modules 40 via a multi-drop serial port along power and control cables 14, although any other suitable communication link may also be used. The embedded controller further communicates (e.g., via the radio telemetry link/antenna 45 or the multi-drop serial port along power and control cables 14) with software run on a personal computer (PC) located in the general area of the radio telemetry equipment that receives information from the sonde. This software, for example, may allow an operator program the overall launch timing sequence or a portion thereof for the system. The controller may communicate with the telemetry receiver computer via a communication link such a radio modem link or any other suitable communication link. The controller 24 further controls the operation of components of the control module 20 in preparation for, during and after launch (e.g., reading sensors and controlling tank fill and drain flow control solenoid valves), performs system timing operations to maintain a desired launch schedule, coordinates operations for individual launch module actions (e.g., balloon fill, launch, retract), monitors sensors relating to the launch of a balloon (e.g., micro-weather station 38 to ensure that conditions are within launch parameters) and monitors and reports system errors.

The control module 20 may further comprise one or more sensor(s) 38 for detecting weather conditions at the location of the control module. The sensor 38, for example, may comprise a micro-weather station shown in FIG. 3. The weather station, in one embodiment, uses no moving parts and measures (1) wind speed, (2) wind direction, (3) relative humidity, (4) barometric pressure, (5) air temperature, (6) two-axis of tilt, magnetic north and (8) GPS location. The unit provides current weather conditions to determine whether a launch is possible or advisable (e.g., extreme winds or hard rain). The data from the weather station may also be used to confirm the sonde's calibration prior to launch.

Figure 4:
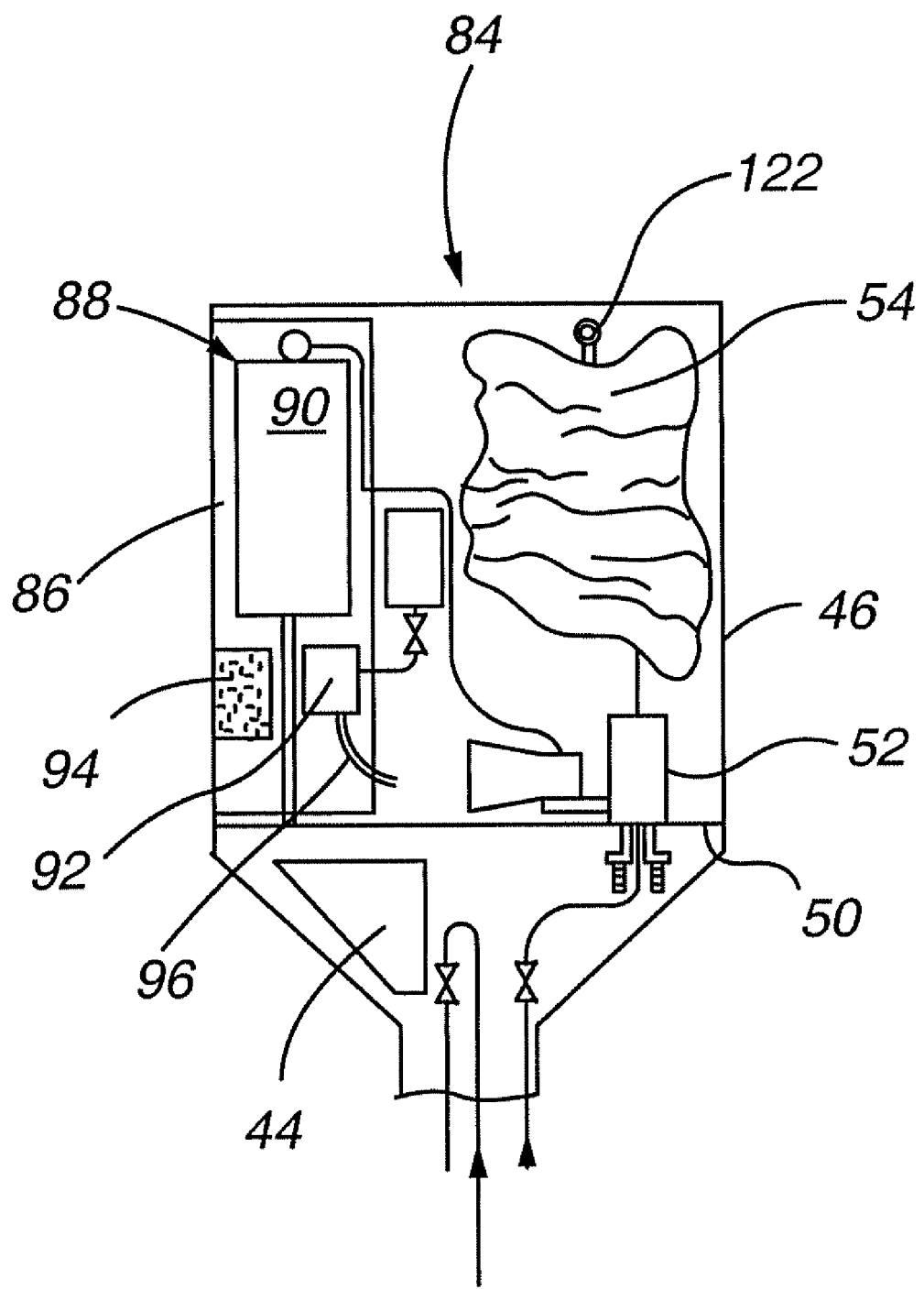
FIG. 4 shows a cutaway view of a balloonsonde preconditioning chamber of a launch module of the automated balloonsonde launcher of FIG. 1.

FIGS. 1, 2 and 4 show a launch module 40 of a distributed balloonsonde launcher system 10. The launch module 40, like the control module 20 described above, is preferably generally cylindrical in shape. Again, the generally symmetrical profile of the cylindrical outer shell 42 minimizes the sensitivity of the module 40 to winds approaching from different directions. The launch module further comprises an inner shell 46 located inside of the outer shell and generally concentric within the outer shell 42. The inner shell 46 and the outer shell 42 together form an annular space 48 around the perimeter of the launch module 40. The annular space 48 houses a protective cover 60 that protects the balloon from puncture or tearing while it is being inflated at the launch module (see FIG. 2). The annular space 48 is preferably large enough to ensure that binding will not occur as the protective cover 60 is deployed during a launch of a balloon.

Figure 5A:
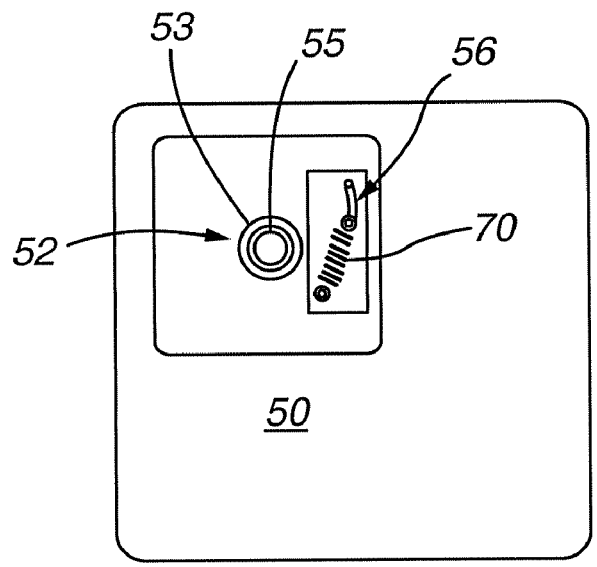
FIGS. 5A and 5B show a top views of the launch deck of a launch module of the automated balloonsonde launcher of FIG. 1.
Figure 5B:
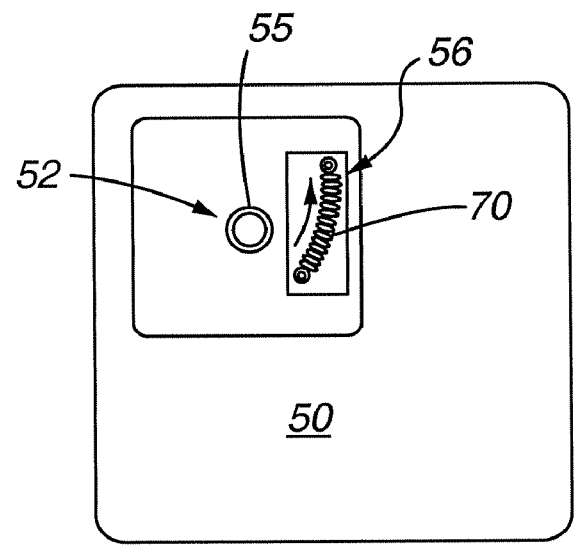

As shown in FIG. 4, a launch deck 50 is located within the inner shell at or near the top to the launch module 40. The launch deck 50 comprises a fill tube 52 for attaching to and inflating a balloon 54. The launch deck 50 is preferably near the top of the launch module 40 so that as the balloon 54 is inflated, the body of the balloon 54 is clear of the outer shell 42 of the launch module 40 and does not press up against the outer shell 42 of the launch module 40. As shown in FIGS. 5A and 5B, the fill tube 52 of the launch deck 52 comprises an outer rim 53 that holds the balloon in place while it is being filled and retracts to release the balloon when the balloon has been filled. A mechanical switch 56 controls the extension and retraction of the outer rim 53 of the fill tube 52. When the switch is in a first position, shown in FIG. 5A, the outer rim 53 is extended out over the mandrel to hold a balloon over the mandrel 55 so that the balloon can be inflated. When the switch is moved to a second position, shown in FIG. 5B, the outer rim 53 of the fill tube 52 retracts below the mandrel 55 to release the balloon from the launch deck.

Figure 6A:
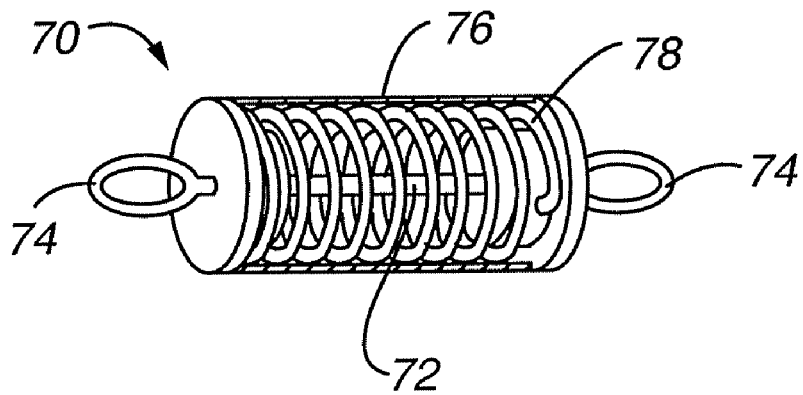
FIGS. 6A through 6C show a hot-link actuator from the launch deck of the launch module of the automated balloonsonde launcher of FIG. 1.
Figure 6B:
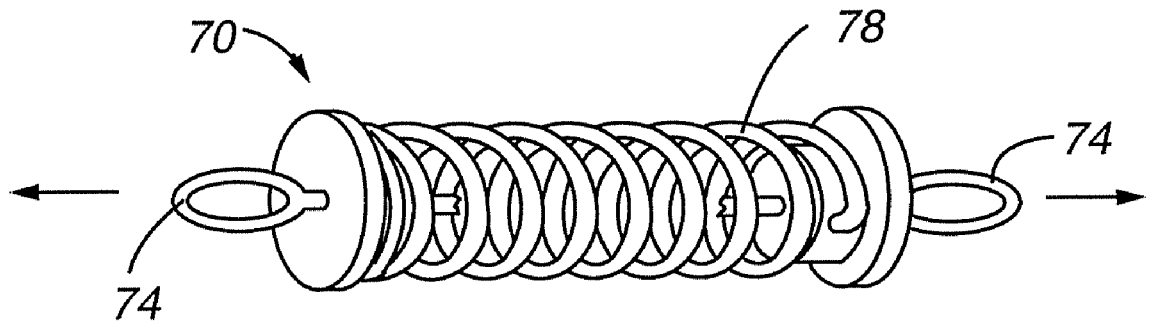
Figure 6C:
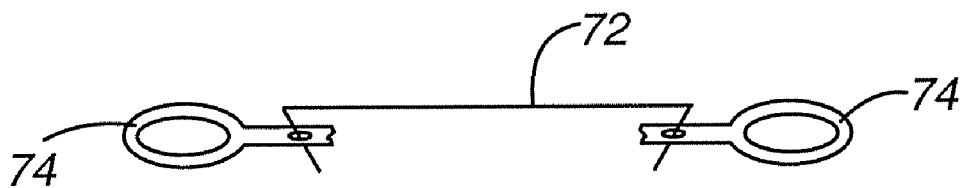

In one embodiment of a balloonsonde launcher, the mechanical switch is activated by a hot-link actuator 70. When the balloon is installed in the launch module 40, the balloon is attached to the mandrel 55 and locked into place by the outer rim 53 of the fill tube 52 by sliding the mechanical switch 56 to the first, locked position. A hot-link actuator 70 is attached to the mechanical switch 56 to hold the switch in the first, locked position until the actuator 70 is activated. The hot-link actuator 70, shown in more detail in FIGS. 6A through 6C, comprises a meltable high-tensile-strength wire 72 that extends between two electrical contacts 74. The hot-link actuator 70 further comprises a protective shroud (e.g., a plastic shroud) 76 that protects the balloon from sparks or from the hot wire 72 when the actuator is activated. A spring 78 biasing the actuator along the axis of the wire 72 is held in a compressed state by the wire 72. The hot-link actuator 70 is connected at a first end at a fixed connector on the launch deck 50 and the second end is connected to a sliding connector that forms a slidable mechanical switch for releasing the balloon. When the balloon is ready for release, the hot-link actuator 70 is activated to release the balloon from the launch deck 50 by flowing current through the wire 72 via the contacts 74 to melt the wire 72. When the wire 72 melts, the spring 78 forces the sliding connector away from the fixed connector 56 and retracts the outer rim 53 from the mandrel 55 to release the balloon from the launch deck 50.

The launch module 40 receives one or more utilities 80 for use in launching a balloon. In the embodiment shown in FIGS. 1 and 2, for example, the launch module receives power and control signals via power and control cables 14, an inflating gas, such as helium, via an inflating gas supply line 16 and compressed air via a compressed air supply line 18. The launch module 40 further comprises a local controller 44 and flow control solenoid valves 82 for dispensing the inflating gas and compressed air as needed for launching a balloon. The local controller 44 of the launch module 40 operates under the control of the controller 24 of the control module 20 (see FIG. 1). The local controller 44 of the launch module 40 communicates with the controller 24 as described above and manages the operation of the launch module 20. For example, the launch controller manages the inflation and deflation of the inflatable extenders 62 as well as the inflation and release of the balloon 54. The local controller 44 further opens and closes the lid of the launch module 40, heats the preconditioning chamber 84 activates the sonde and opens the sealed sonde storage chamber 86. The local controller preferably comprises embedded firmware for controlling the operations of the launch module 40.

As shown in FIG. 4, the launch module 40 further comprises a sonde conditioning chamber 84. The sonde conditioning chamber 84 comprises a sealed sonde compartment 86 in which an operator may install a sonde for release. The sonde 88 may comprise a commercially available sonde, such as those available from Vaisala and Sippican, or may comprise a specially designed sonde. The sonde 88, in one embodiment, comprises an instrument 90, a battery 92, such as the water-activated battery shown, a dessicant 94 and a drain 96 for releasing water from the battery 92 once it has been activated. The dessicant 94 removes moisture, when present in the sealed sonde compartment 86, to prevent a humidity sensor in the instrument from being degraded and to prevent the battery from being prematurely activated. The humidity of the chamber is preferably kept near the conditions when the sonde 88 was installed in the compartment 86. At a minimum, the humidity is maintained below ambient humidity conditions. A water reservoir is provided in the sonde conditioning chamber 84 for supplying water to activate the battery 92 when a launch is scheduled. The sonde conditioning chamber further comprises a launch deck 50 to which a balloon is attached for inflation. The balloon 54 and the sonde 88 are preferably attached to each other via a balloon release and latch (described below with reference to FIGS. 14A through 14B). The launch module 40 further comprises utilities for delivering an inflating gas and compressed air under control of the local controller 44. The local controller controls the operation of solenoid valves 82 to direct the inflating gas to the balloon 54 and the compressed air to the inflatable extenders 62 of the protective cover 60.

Figure 7:
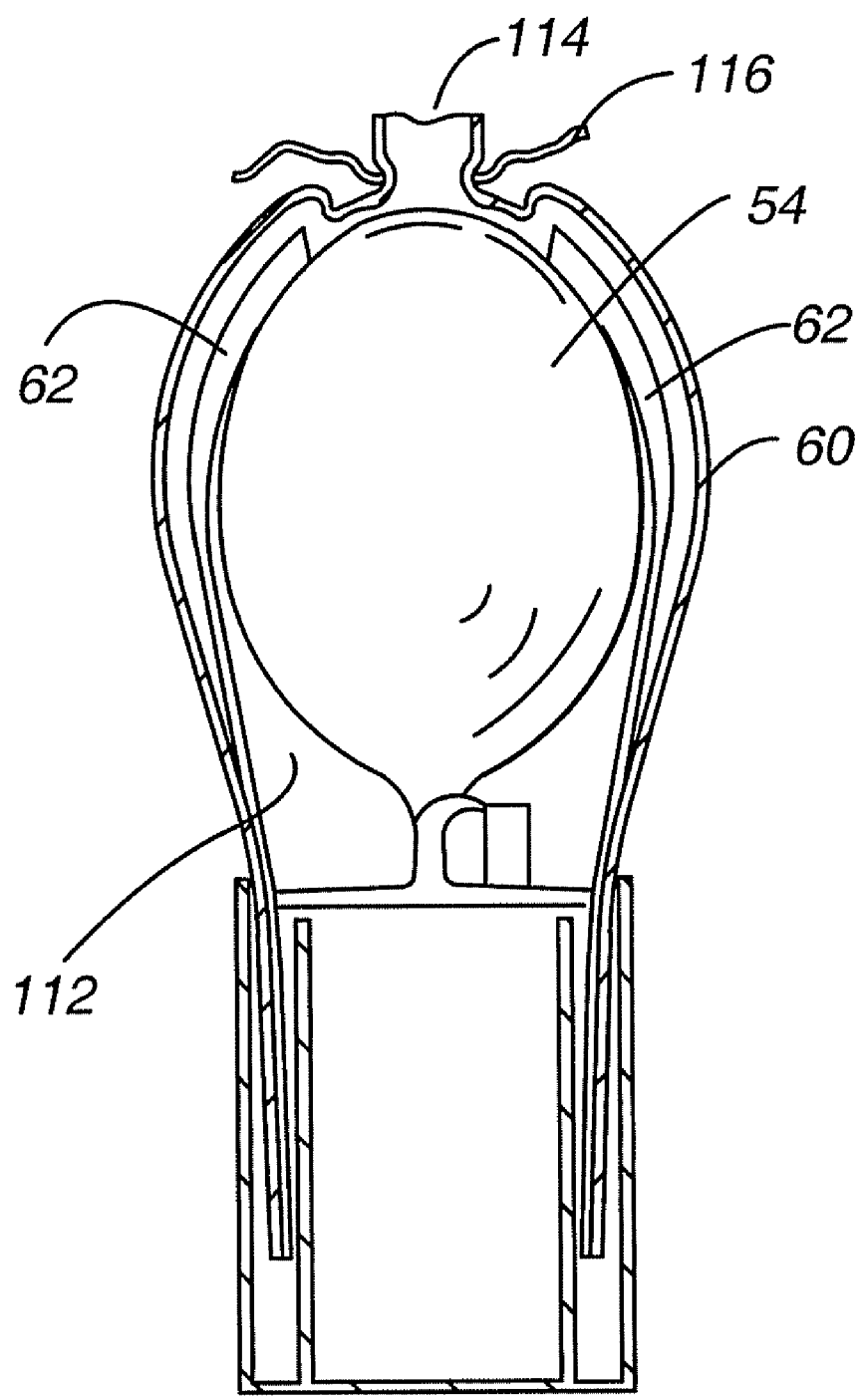
FIG. 7 shows a cross-sectional side view of a launch module of the automated balloon launcher of FIG. 1 in which a balloon is being inflated.

FIG. 7 shows an embodiment of the present invention in which a balloon 54 is inflated within a protective cover 60. The protective cover 60 surrounds at least the portion of the balloon 54 extending outside of the launch housing 40. The protective cover 60 may be at least partially inflated itself, may include inflatable components, such as the inflatable extenders 62 shown in FIG. 7, or may simply provide a protective cover that is more resilient than the balloon itself. The protective cover 60 prevents significant distortion of the balloon 54 during the time when the balloon 54 is being inflated and is most vulnerable. When the balloon 54 has been inflated, the protective cover 60 is opened and allows the balloon with an attached sonde to be released.

Figure 8:
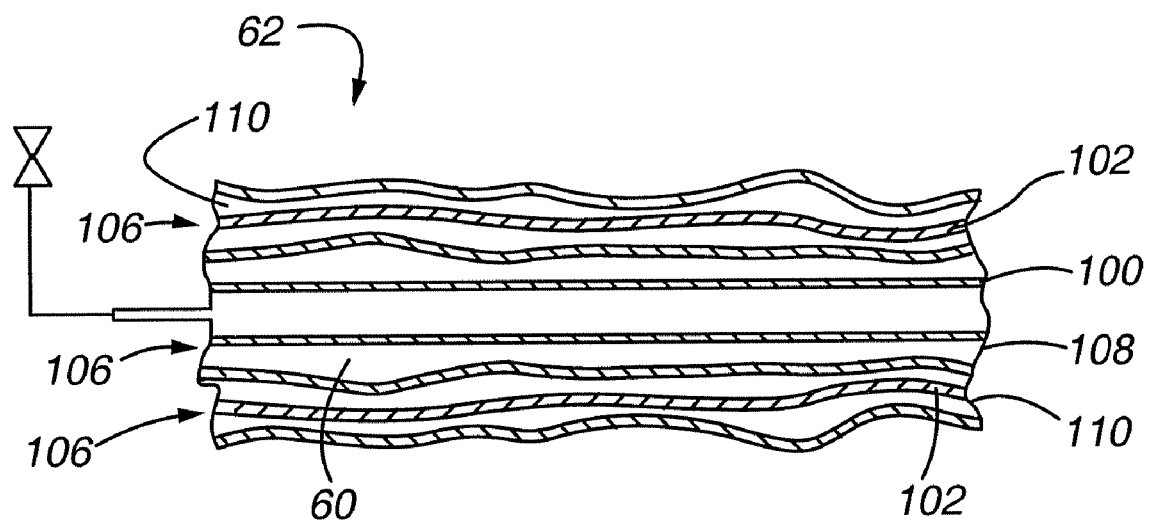
FIG. 8 shows a cross-sectional view of an inflatable extender of a protective cover shown in FIG. 7.
Figure 9G:
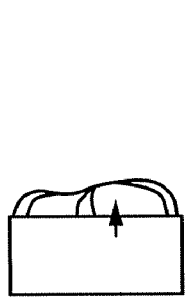
Figure 9G:
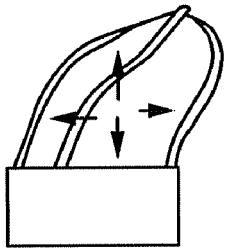
Figure 9G:
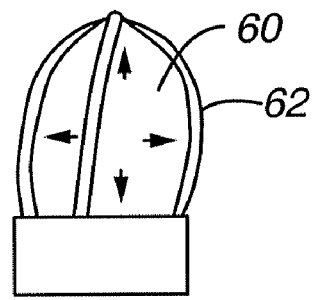
Figure 9G:
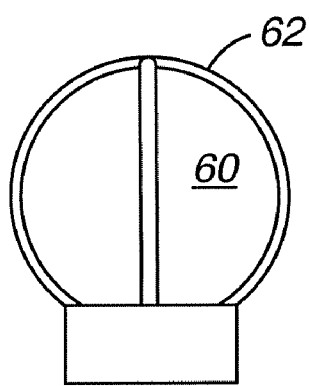
Figure 9G:
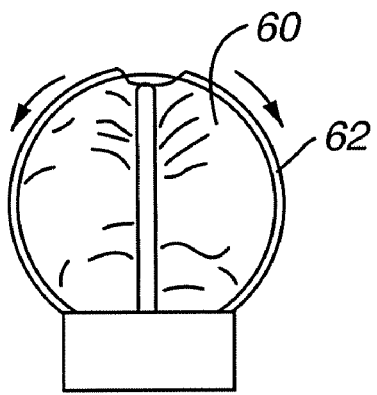
Figure 9G:
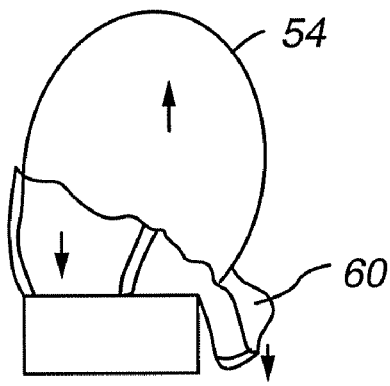
Figure 9G:
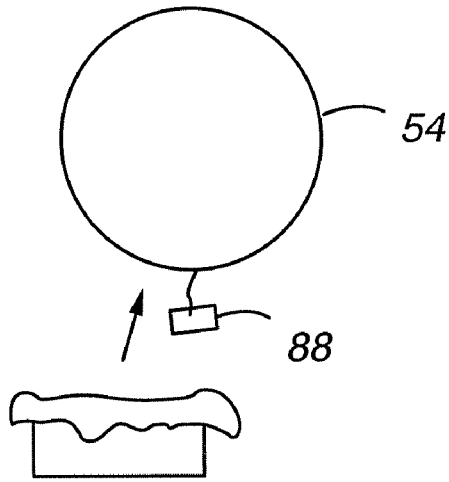

In one particular embodiment, for example, the protective cover 60 comprises inflatable extenders 62 attached to the protective cover 60 as shown in FIG. 8. In this embodiment, the inflatable extenders 62 are attached (e.g., sewn) to the protective cover 60. One skilled in the art, however, would recognize that the inflatable extenders 62 may be attached to the protective cover 60 in any other suitable manner known in the art or may be incorporated into the protective cover 60. Each inflatable extender preferably comprises an inflatable tube 100 and one or more elastic retraction members 102. In the embodiment shown in FIG. 8, for example, the protective cover comprises three chambers 106 sewn into the protective cover 60. In this embodiment, an inflatable tube 100 extends through the central chamber 108 and an elastic retraction member extends through each outer chamber 110. As shown in FIGS. 9A through 9G, as the inflatable tube 100 is inflated, the force of the compressed air overcomes the biasing of the elastic retraction members 102 to raise the protective cover 60 away from the launch module 40. In the embodiment shown in FIGS. 7 and 9A through 9G, for example, the protective cover 60 comprises five inflatable extenders 62 that, when inflated (e.g., to approximately 10 p.s.i.), push the protective cover 60 out and upward in a five-legged teepee structure from the launch housing 42. The protective cover 60 provides a chamber 112 in which the balloon 54 is inflated with an inflating gas.

The protective cover further comprises an opening 114 located at or near the top of the protective cover 60 when the inflatable extenders 62 are inflated and a release mechanism 116 for opening the chamber 112. When the balloon 54 has been inflated within the chamber 112 formed by the protective cover 60, the release mechanism 116 opens the chamber 112 so that the balloon with the attached sonde may be released from the protective cover. In the embodiment shown in FIG. 7, for example, the release mechanism comprises a rope (e.g., a nylon rope) that encircles the opening 114 of the protective cover 60. The rope passes through a block containing a heating coil (e.g., a nichrome wire) that heats when a current is applied. When the opening 114 is to be opened, the controller directs a current through the heating coil and melts or burns the rope, which releases the opening 114 of the protective cover 60. As the release mechanism 116 opens the chamber 112 by releasing the opening 114 of the protective cover 60, the inflatable extenders 62 are rapidly deflated and the elastic retraction members 102 retract the protective cover 60 toward the launch module 40 and exposes the balloon 54.

Figure 10:
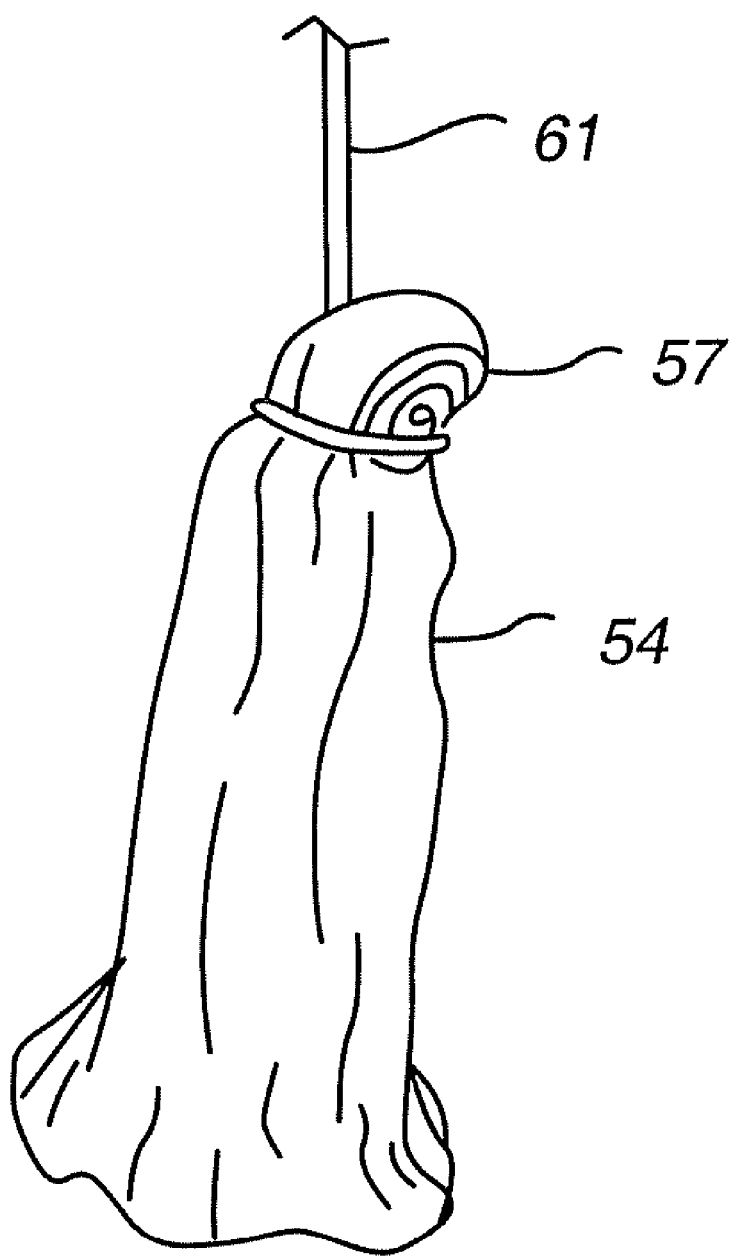
FIG. 10 shows a view of one embodiment for attaching the tope end of a balloon to a protective cover to aid inflation of a balloon.
Figure 11A:
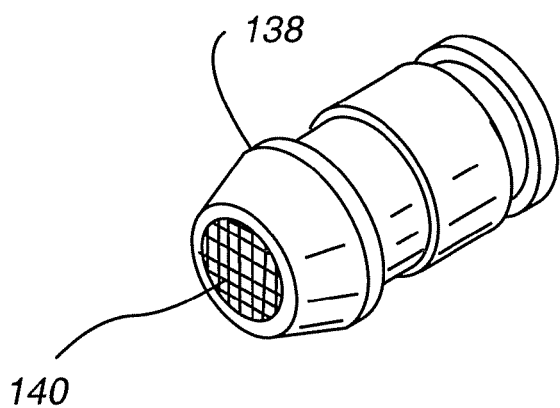
FIGS. 11A through 11D show a one-way valve for inflating a balloon but not allowing gas to escape back out of the balloon after inflation.
Figure 11B:
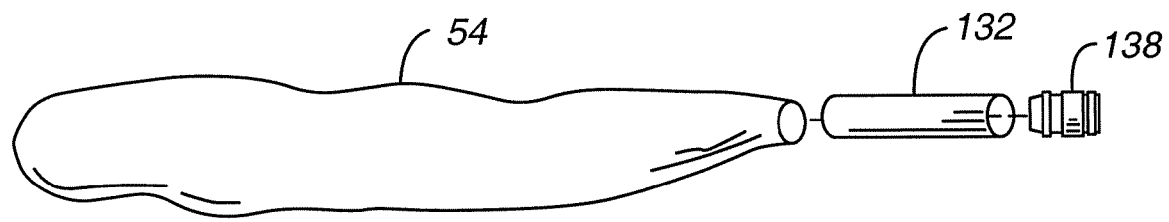
Figure 11C:
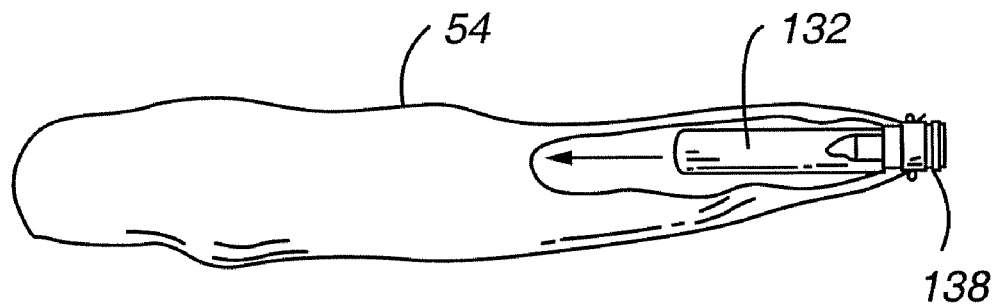
Figure 11D:
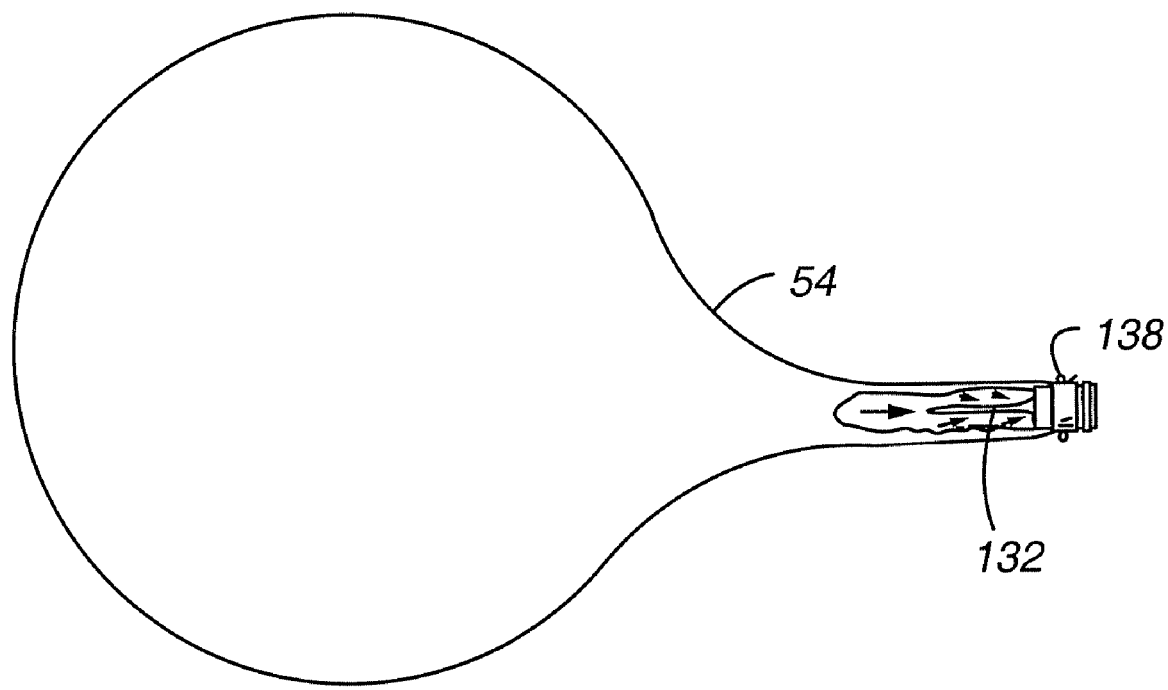

The protective cover 60 may also comprise a connector 120 attached to the top of the cover 60 for attaching to the balloon 54. As the protective cover is raised away from the launch module 40, the connector 120 unfolds the balloon 54 and extends the balloon vertically from the launch deck 50. By extending the balloon 54, the protective cover 60 eases the inflation of the balloon 54 and prevents the balloon from being caught on other components of the launch module 40. In the embodiment shown in FIG. 10, for example, the protective cover 60 comprises an elastic (silastic) tube 31 attached to the top of the protective cover 60 and looped loosely around a rolled portion 57 of the top of the balloon 54. As the balloon inflates, the portion of the balloon in the loop unrolls and rolls the elastic tubing off the balloon 54. Alternatively, as shown in FIG. 4, the balloon 54 may comprise an eyelet 122 attached to the top of the balloon for attaching to the protective cover 60. In this embodiment, the eyelet 122 is preferably attached to the release mechanism 116 of the protective cover 60 so that as the top of the protective cover 60 is opened, the eyelet 122 is also released from the protective cover 60.

The protective cover 60 preferably comprises a material such as Tyvek (TM) or polyethylene that provides a tough puncture-resistant protective layer over the balloon when it is being inflated yet also provides a relatively low coefficient of friction with the surface of the balloon. Thus, when the release mechanism 116 releases the opening 114 of the protective cover 60 and the inflatable extenders 62 are deflated, the protective cover 60 preferably slides easily off the surface of the balloon 54 as the protective cover 60 falls away from the balloon 54.

In one embodiment, the protective cover 60 retracts into the annular space 48 of the launch module 40 as it retracts so that it is ready for a subsequent balloonsonde launch. Alternatively, the cover of the launch module may automatically return the protective cover to the annular space 48 of the launch module 40.

FIGS. 11A-11D show a valve 130 that may be used in a balloonsonde launcher system of the present invention to inflate the balloon 54. The valve 130 comprises a tube 132 formed of a flexible material, such as latex. The tube 132, when open, forms a channel 134 through which an inflating gas may flow and, when closed, collapses upon itself to close the channel 134. On a first (inlet) end 136 of the valve 130, the tube 132 of the valve 130 extends over a nozzle 138. The nozzle 138 holds the first (inlet) end 136 of the valve 130 open so that an inflating gas may flow into the channel 134. When the inflating gas flows into the channel 134 through the nozzle 138 at a pressure greater than the internal pressure of the balloon 54, the inflating gas pressurizes the channel 134 and opens the valve 130, allowing the inflating gas to flow into the balloon. When the flow of the inflating gas is stopped, or the internal pressure of the balloon 54, is greater than the pressure of the inflating gas, the tube 132 of the valve 130 collapses and closes the valve 130 so that gas cannot flow back out of the balloon 54. The nozzle 138 comprises a screen 140 that allows the inflating gas to flow through the nozzle 138 but prevents the flexible tube from being pushed back into the nozzle by the pressure in the balloon 54 when the flow of inflating gas is stopped. The tube 132 may comprise a generally cylindrical shape, as shown in FIGS. 11A through 11D, or may comprise any other shape that, when open, forms a channel 134 through which an inflating gas may be flowed and, when closed, collapses upon itself to prevent the inflating gas from flowing back out of the balloon 54 through the channel 134 of the valve. Alternatively, one skilled in the art would recognize that other single-direction valves may be used within the scope of the present invention.

In the distributed platform embodiment (see e.g., FIGS. 1 and 2), individual launch modules 40 are preferably arranged in an array and can be spaced apart sufficiently to prevent a launch failure in one module (e.g., a snagged balloon or tangled sonde) from adversely affecting the other modules. Any number of launch modules 40 may be attached to a particular control module 20. Where more than one launch module 40 is connected to a particular control module 20, the individual launch modules 40 are connected together in a network with the control module 20. In the particular embodiment shown in FIGS. 1 and 2, for example, the launch modules 40 are daisy-chained together. Alternatively, the launch modules may be connected in parallel or any other connection method known in the art. In one particular embodiment, the launch modules are tethered together using quick-connectors or end-indifferent quick connectors to minimize the difficulty of connecting the launch modules 40 to the control module and to maximize the flexibility by allowing for standard interconnects that may be used interchangeably between modules.

Figure 12:
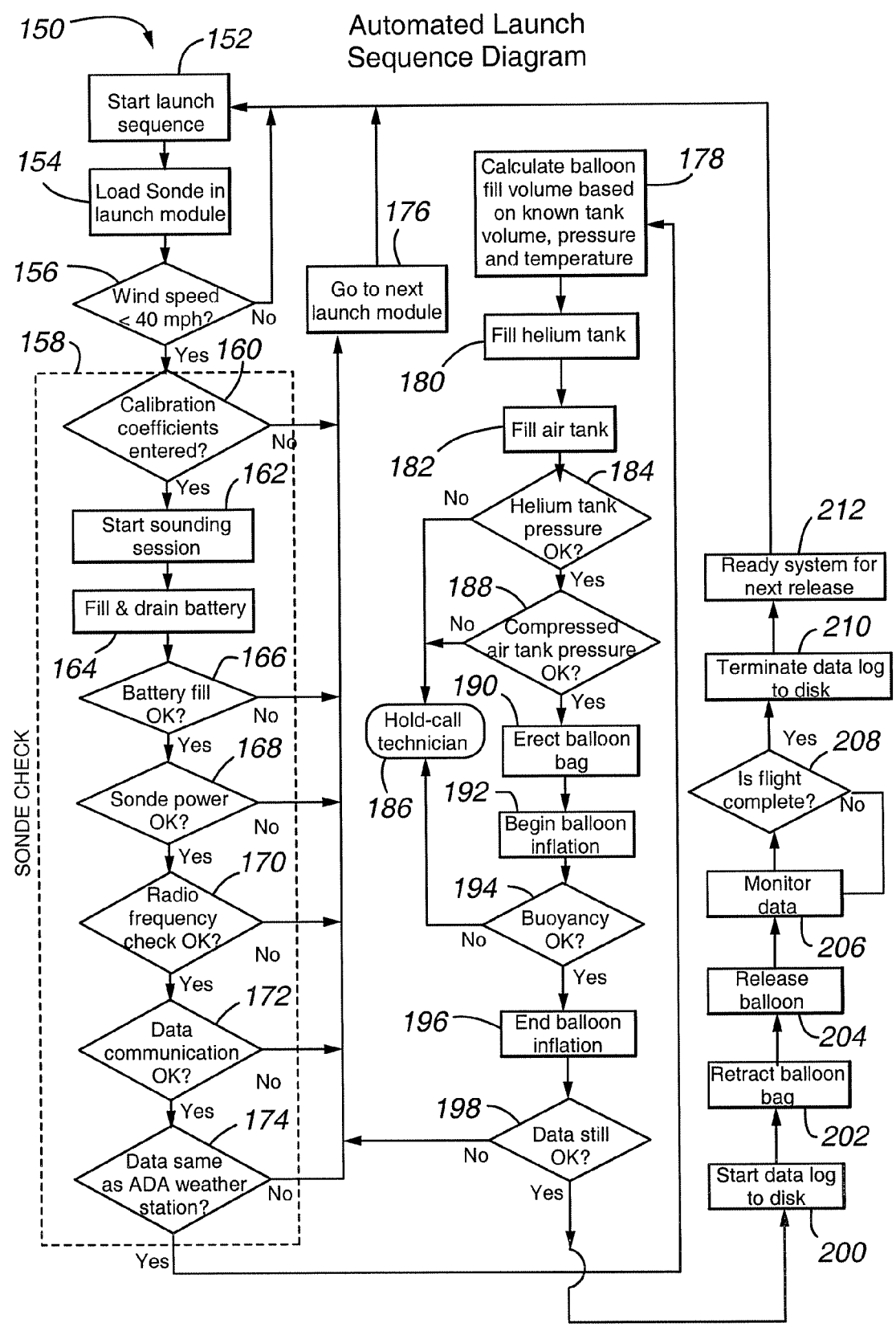
FIG. 12 shows a flow diagram of a first embodiment of a process for launching a balloonsonde according to the present invention.

FIG. 12 shows a flow diagram of a process 150 for launching a balloonsonde according to one embodiment of the present invention. In the process 150, a launch sequence is started in operation 152. The launch sequence may be started manually by an operator, such as locally at a control module or telemetry computer or remotely from a computer or terminal attached to the control module or telemetry computer via a network. The launch sequence may also be started automatically, such as by an application running on the controller in the control module, the telemetry computer or a remote computer attached to the control module or telemetry computer via a network. The sonde is loaded into the launch module in operation 154.

The process 150 determines whether the weather conditions are acceptable for a sonde launch in operation 156. This determination may be performed using one or more of various methods. As shown in FIG. 12, for example, the process determines whether the wind speed is less than a predetermined threshold (40 miles per hour in this example). One skilled in the art, however, would readily recognize that other determinations such as a rainfall rate less than a predetermined threshold or querying an operator may be used to determine whether minimum weather conditions exist for a successful balloonsonde launch.

The process also performs a sonde check operation 158. The sonde check operation 158 may include, for example, particular operations for determining whether a particular type of sonde is operating correctly. If one or more of the tests performed in the sonde check operation 158 fail, the process may abort the launch sequence for the particular launch module and proceed to initiate a launch sequence for another launch module (if one is available) in operation 176. If the tests of the sonde performed by the sonde check operation 158 indicate that the sonde is operating correctly, however, the process 150 proceeds with the launch sequence to operation 178.

The sonde check operation 158 comprises one or more tests to determine whether the sonde to be launched in a launch module is operating satisfactorily. Depending upon the particular sonde to be launched, the tests may be tailored to test the operation of that type of sonde. In the embodiment shown in FIG. 12, for example, the sonde check operation 158 comprises a determination whether sonde calibration coefficients have been entered into the receiver station in operation 160. The sonde check operation 158 further comprises a sounding session, which is initiated in operation 162. The water-activated battery is filled and drained in operation 164 to activate the power supply for the sonde. The sonde check operation 158 also determines whether the battery fill operation 164 was successfully completed in operation 166. The sonde check operation 158 also determines whether the sonde power is operating at a satisfactory level in operation 168. In operation 170, the sonde check operation 158 tests whether the transmitter of the sonde is operating satisfactorily. The sonde check operation 158 further tests whether data communication is operating correctly in operation 172 and compares the data to an external source (a local weather station in this embodiment) in operation 174.

The process 150 also calculates the balloon fill volume based on known tank volume, pressure and temperature in operation 178. Based on these calculations, the process 150 then fills the helium tank and the compressed air tank in operations 180 and 182, respectively. The process further tests the pressure of the helium tank and compressed air tank in operations 184 and 188, respectively. If the pressure of the helium tank and/or the compressed air tank are not correct (e.g., within a calculated range or above/below a calculated threshold), the process 150 discontinues at operation 186. As shown in FIG. 12, the process 150 may place itself in a hold state until the pressure of the helium and compressed air tanks are corrected and send an error message indicating the problem. Such an error message, for example, may comprise a message to a technician or an operator. In this embodiment, the process 150 may remain in the hold state until the error is cleared (as shown in FIG. 12) or may abort after a time-out occurs. In the event that the process aborts, after the time-out occurs, the process 150 may terminate the launch sequence or may proceed to operation 176 to initiate a launch sequence for another launch module (if the other launch module is available and includes separate helium and/or compressed air tanks).

If the pressures of the helium tank and compressed air tank are both correct, however, the process 150 initiates erecting the protective cover (e.g., by inflating the inflatable extenders) in operation 190. The process 150 also initiates the inflation of the balloon in operation 192. The inflation of the balloon may coincide with or overlap the erection of the protective cover or may commence after the protective cover has been completely erected (e.g., by completely inflating the inflatable extenders). In one particular embodiment, for example, the inflation of the balloon is delayed until the protective cover is at least partially erected. In this manner, the protective cover is able to extend the balloon (as described above with reference to FIG. 7) and provides a resilient structure in which the balloon is inflated.

Process 150 monitors the buoyancy of the balloon during inflation in operation 194 to determine if the balloon properly inflated and is ready for release. If the balloon is properly inflated, the process 150 terminates the inflation in operation 196 and proceeds to operation 198. If the balloon is not properly inflated within a predetermined time out period, however, the process 150 may place itself in a hold state by proceeding to operation 186. The process 150 may also send an error message indicating the problem. Such an error message, for example, may comprise a message to a technician or an operator. In this embodiment, the process 150 may remain in the hold state until the error is cleared (as shown in FIG. 12) or may abort after a time-out occurs. In the event that the process aborts, after the time-out occurs, the process 150 may terminate the launch sequence or may proceed to operation 176 to initiate a launch sequence for another launch module (if another launch module is available).

After the process 150 has terminated the balloon inflation, the process proceeds to determine whether the sonde is still successfully transmitting data. If the sonde is no longer successfully transmitting the data, the process 150 may proceed to operation 176, abort the launch sequence for the particular launch module and proceed to initiate a launch sequence for another launch module (if one is available). If the sonde is still transmitting data correctly, however, the process 150 proceeds with the launch sequence to operation 200 and initiates a data log operation in which the data is stored on a data storage device, such as the disk identified in the embodiment shown in FIG. 12.

Process 150 then retracts the protective cover in operation 202. In the embodiment described above with respect to FIGS. 7 and 9A through 9G, for example, this may be accomplished by releasing the top opening of the protective cover and deflating the inflatable extenders. This allows the elastic members to retract and exposes the balloon in preparation for launch. The process 150 then releases the balloon in operation 204.

Figure 14A:
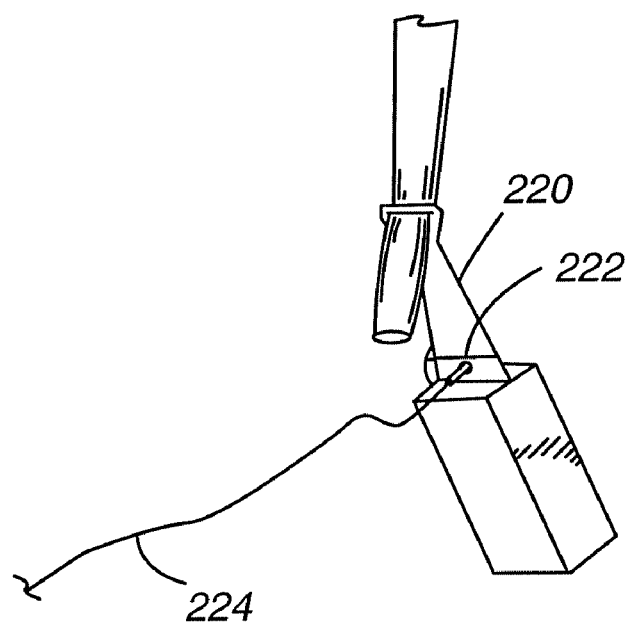
FIGS. 14A and 14B show an embodiment of an apparatus for lowering a sonde from a balloon during flight.
Figure 14B:
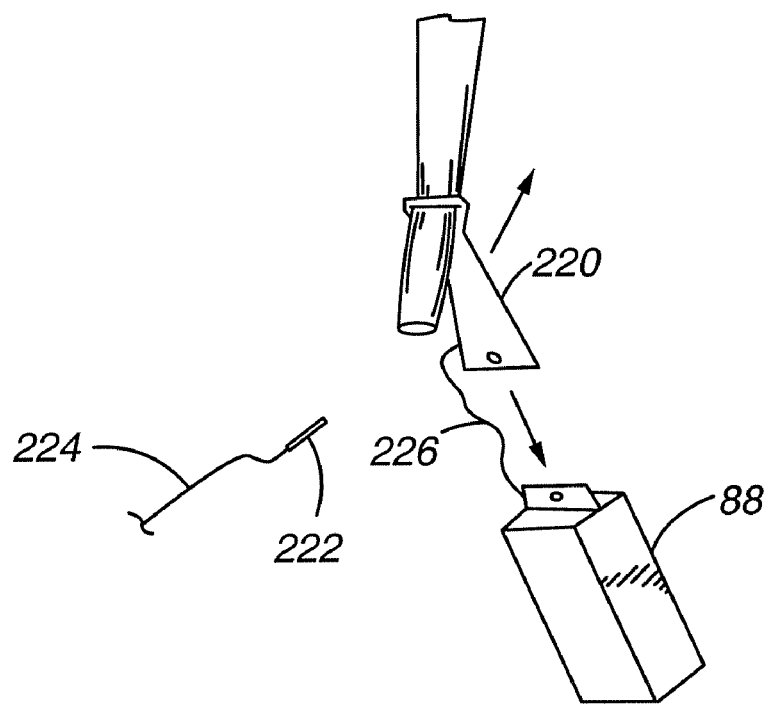
Figure 15A:
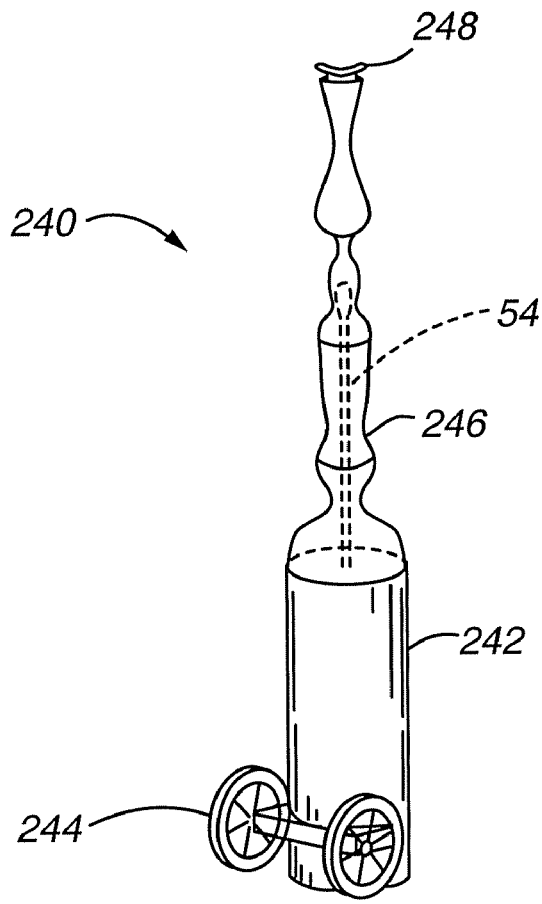
FIGS. 15A through 15D show perspective views of a second embodiment of an automated balloon launcher of the present invention.
Figure 15B:
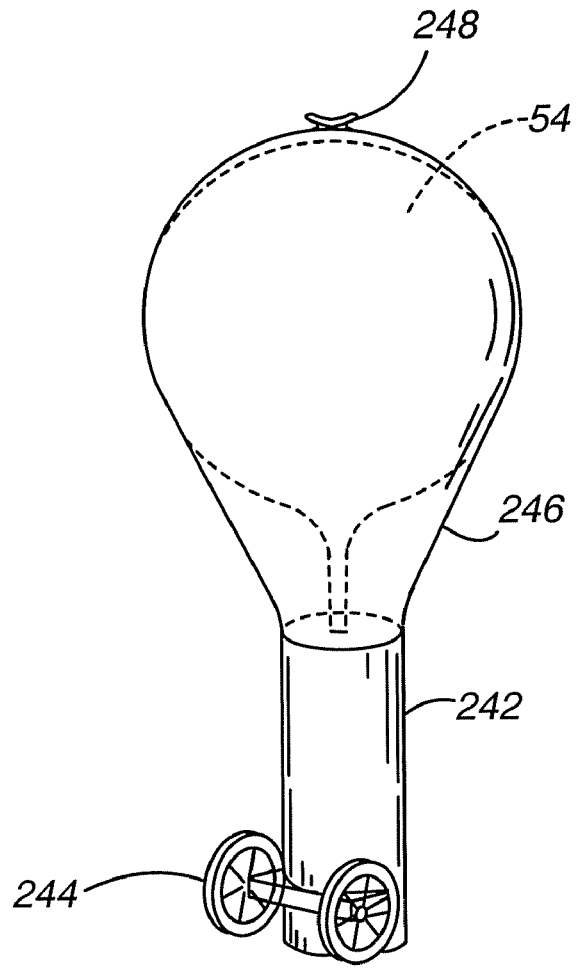
Figure 15C:
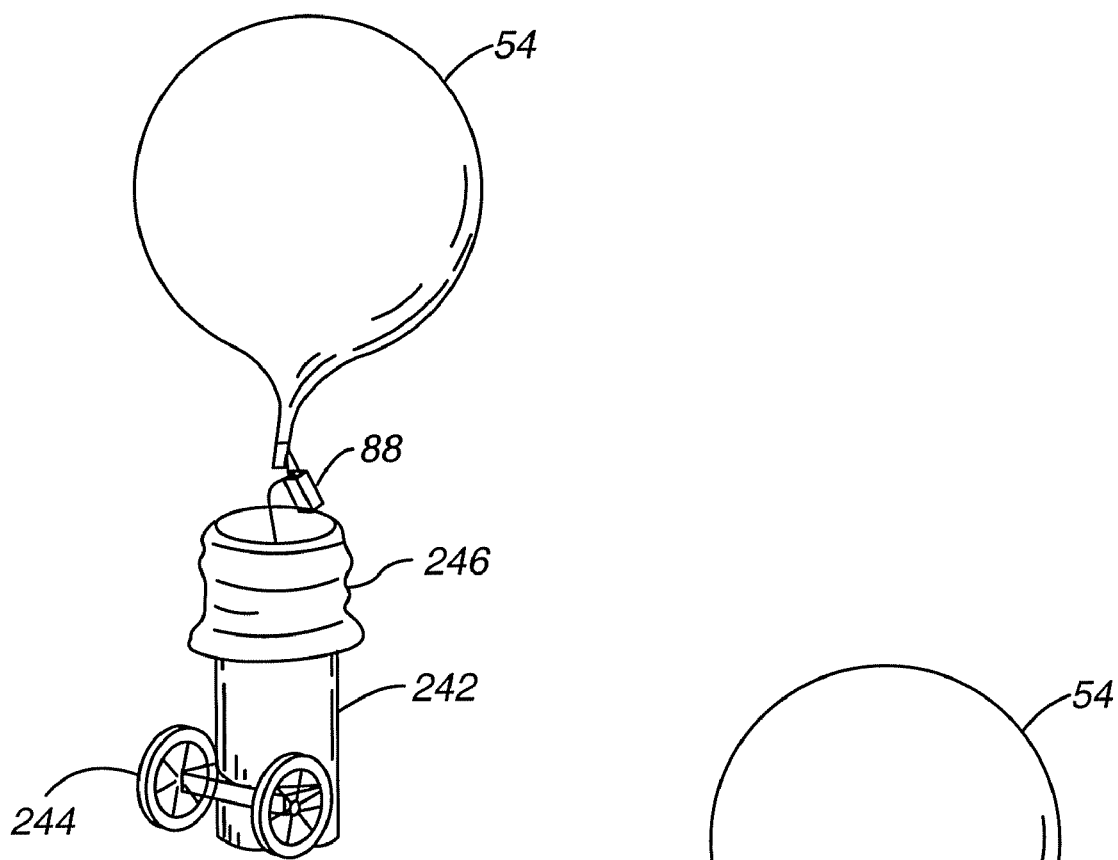
Figure 15D:
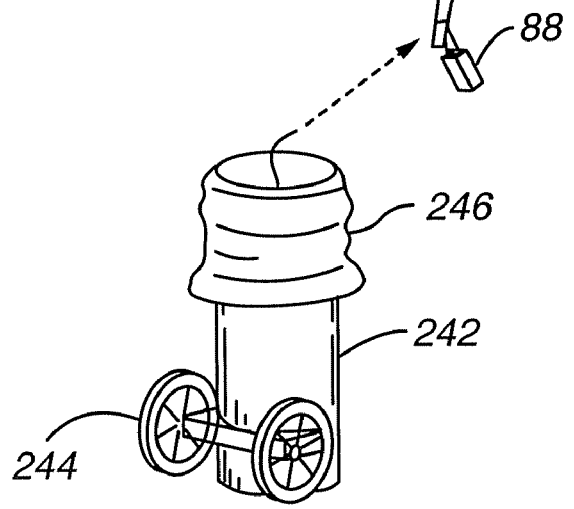

FIGS. 14A and 14B show a balloonsonde being released from the automated balloonsonde launcher. As the balloon 54 is released, the sonde 88 is attached to the balloon via a spool 220. The spool 220 is attached to the balloon 54 and is held in a locked configuration by a pin 222 when the balloon 54 is released from the launcher. The pin 222 is attached to the launcher via a tether 224. As the balloon 54 rises away from the launcher, the pin remains engaged in the spool until the tether reaches a taught position. As the balloon 54 rises past the reach of the tether 224, the tether 224 pulls the pin 222 from the spool 220 and unlocks a cable 226 from the spool 220. The cable 226 of the spool 220 unwinds and lets the sonde 88 fall farther away from the balloon 54 as it rises away from the launcher. In this manner, the sonde 88 is held close to the balloon 54 as the balloon 54 is released from the launcher so that the sonde 88 and the cable 226 supporting the sonde do not get tangled on the launcher or other nearby objects during or shortly after a launch. Once the balloon 54 is sufficiently far enough away from the launcher, however, the sonde 88 is lowered from the balloon 54 so that the sonde 88 is able to detect atmospheric conditions without being affected by the wake of the balloon.

After releasing the balloon, the process 150 proceeds to operation 206 in which the process monitors data received from the sonde. The process continues to monitor the data until it is determined that the flight has been completed in operation 208. The flight may be determined to be complete using one or more factors such as flight time, altitude, loss of signal, balloon popping or the like. When the flight is complete, the process terminates the data log to the data storage device (e.g., disk) in operation 210, readies the system for the next release (if another launch module is available) in operation 212 and returns to operation 152 when the next release is scheduled.

FIGS. 15A through 15D show an alternative embodiment of a portable balloonsonde launcher system 240 of the present invention. The portable balloonsonde launcher system comprises a single housing 242 containing the components of the control module and the launch module of the previous embodiment. The portable balloonsonde launcher system 240, for example, comprises a controller for controlling the launch sequence, an inflating gas reservoir for providing an inflating gas to a balloon and solenoid valves for controlling the flow of the inflating gas into the reservoir and from the reservoir to the balloon. As shown in FIGS. 15A through 15D, the portable balloonsonde launcher 240 preferably comprises wheels 244 for moving the launcher 240 to a desired launch site.

The portable balloonsonde launcher 240 further comprises a protective cover 246 that protects the balloon 54 from puncture and tearing while it is being inflated at the launcher 240. As shown in FIGS. 15A through 15D, the protective cover 246 need not include the inflatable extenders described above with respect to the distributed balloonsonde launcher 10. In this embodiment, as the balloon is inflated with the inflating gas, the balloon 54 extends within the protective cover 246. As described above with respect to the distributed balloonsonde launcher, the protective cover 246 comprises a release mechanism 248 for opening the top of the protective cover 246 so that the balloon may be released. As the opening of the protective cover is released, the launcher 240 may further comprise weights located inside the protective cover, which are released outside housing 242 and pull the protective cover down around the balloon 54. Alternatively, elastic members, such as described above, may be installed in the protective cover 246 which pull the protective cover 246 down around the balloon 54 when the opening is released.

In one embodiment, the balloon 54 and protective cover 246 may be disposable. In this embodiment, the balloon 54 comes pre-loaded in a protective cover 246 that may be attached to the launcher 240 (e.g., to housing 242 or to a launch deck). After the balloon 54 is launched the protective cover 246 may be removed from the launcher and discarded or recycled and used with another balloon. In one embodiment, for example, the balloon 54 is located inside the protective cover 246 and the combined balloon 54 and protective cover 246 are loaded into a tube that is connected to the launcher 240. When the balloon is inflated, both the protective cover 246 and the balloon lift out of the tube as shown in FIGS. 15A through 15D.

The portable balloonsonde launcher may further comprise a docking station to which the launcher 240 is temporarily attached to utilities such as power and an inflating gas in preparation for launch, and disconnected from to be moved to the desired launch site. On a ship deck, for example, a docking station may be located near the utility locations on the ship and the launcher, after it has been prepared for a launch may be wheeled to the most advantageous side of the deck for launching a balloon depending upon wind conditions, ship direction, and the like. The docking station, for example, may comprise a connection, such as a quick connection gas fitting to a helium gas supply. The quick connection preferably would maintain seals for both the docking station supply line and the launch module tank when the launch module is disconnected from the docking station. The docking station may further comprise similar fittings for compressed air in embodiments which use compressed air for inflatable extenders. The docking station also preferably provides electrical power for charging an energy storage device (e.g., a battery) of the launch module while it is connected to the docking station.

Figure 13:
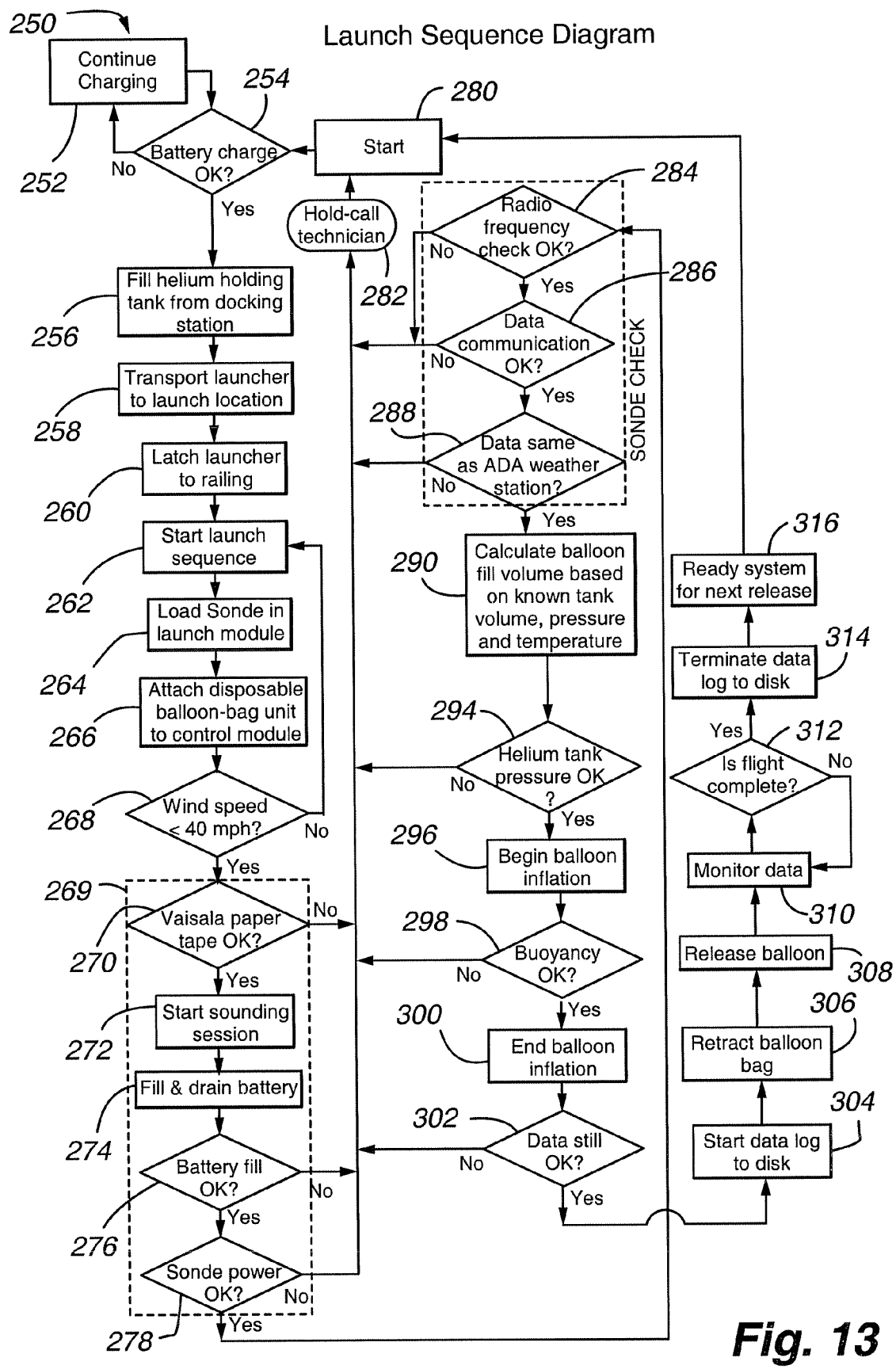
FIG. 13 shows a flow diagram of a second embodiment of a process for launching a balloonsonde according to the present invention.

FIG. 13 shows a flow diagram of a process 250 for launching a balloonsonde according to the second embodiment of the present invention corresponding to a portable balloon launcher described above with reference to FIGS. 15A through 15D. In the process 250, a launch sequence is started in operation 280. As described above with reference to FIG. 12, the process 250 may be started manually or automatically. The process determines whether the battery of the portable launcher is sufficiently charged in operation 254. If the battery charge is insufficient, the process delays the process 250 in operation 252 to continue charging the battery of the portable launcher. Once the process 250 has determined that the battery is sufficiently charged, the process 250 fills the helium holding tank in the launcher. Where the portable balloon launcher system comprises a docking station, for example, the docking station may comprise utilities for preparing the portable launcher for operation (e.g., battery charger circuit, inflating gas supply and the like). When the portable launcher is charged and loaded with an inflating gas, the portable launcher is transported to a launch location in operation 258. The portable launcher, where desired, may optionally be secured at the launch location. Onboard a ship, for example, the portable launcher may be secured to a railing or another fixed location. The portable launcher may also be secured in some embodiments by locking or removing the wheels where a fixed object, such as a railing, is not available or needed.

The process 250 initiates a launch sequence in operation 262. A sonde is loaded into the portable launcher in operation 264. A disposable balloon-bag unit is attached to the control module in operation 266. The process 250 also determines whether the weather conditions are acceptable for a sonde launch in operation 268. As described above with reference to FIG. 12, this determination may be performed using one or more of various methods such as determining whether the wind speed is less than a predetermined threshold (e.g., 40 miles per hour) or other determinations as described above.

As described above, the process also performs a sonde check operation 269. The sonde check operation 269 may include, for example, particular operations for determining whether a particular type of sonde is operating correctly. If one or more of the tests performed in the sonde check operation 269 fail, the process may place itself in a hold state until the problem is corrected. The process 250 may also send an error message indicating the problem. The error message may, for example, comprise a message to a technician or an operator or may display on a control panel of the portable launcher. The process 250 may remain in a hold state until the error is cleared, may abort the launch sequence immediately (as shown in FIG. 13) or may abort the launch sequence after a time-out occurs. If the tests of the sonde performed by the sonde check operation 269 indicate that the sonde is operating correctly, however, the process 250 proceeds with the launch sequence to operation 290.

The process 250 also calculates the balloon fill volume based on known tank volume, pressure and temperature. The process 250 tests the pressure of the helium tank in operation 294. If the pressure of the helium tank is not correct (e.g., within a calculated range or above/below a calculated threshold), the process 250 discontinues at operation 282. As shown in FIG. 13, the process 250 may place itself in a hold state until the pressure of the helium tank is corrected and send an error message indicating the problem. The error message, for example, may comprise a message to a technician or an operator. In this embodiment, the process 250 may remain in the hold state until the error is cleared, may abort the launch sequence immediately (as shown in FIG. 13) or may abort the launch sequence after a time-out occurs.

If the pressure of the helium tank is correct, however, the process 250 begins inflating the balloon in operation 296. The process 250 monitors the buoyancy of the balloon during inflation in operation 298 to determine if the balloon properly inflated and is ready for release. If the balloon is properly inflated, the process 250 terminates the inflation in operation 300 and proceeds to operation 302. If the balloon is not properly inflated within a predetermined time out period, however, the process 250 may place itself in a hold state by proceeding to operation 282. As described above, the process 250 may also send an error message indicating the problem. The process 250 may remain in the hold state until the error is cleared (as shown in FIG. 13) or may abort after a time-out occurs.

After the process 250 has terminated the balloon inflation, the process proceeds to determine whether the sonde is still successfully transmitting data in operation 302. If the sonde is no longer successfully transmitting the data, the process 250 may place itself in a hold state by proceeding to operation 282. If the sonde is still transmitting data correctly, however, the process 250 proceeds with the launch sequence to operation 304 and initiates a data log operation in which the data is stored on a data storage device, such as the disk identified in the embodiment shown in FIG. 13.

Process 250 then retracts the protective cover in operation 306. In the portable launcher embodiment of FIGS. 15A through 15D, for example, the retraction of the protective cover may comprise releasing a top opening of the protective cover and retracting the protective cover down towards the portable launcher. The process 250 then releases the balloon in operation 308. As described above with respect to FIGS. 14A through 14B, the balloonsonde is preferably released so that the sonde is initially held close to the balloon and then after the balloon is further from the launcher, the sonde is extended away from the balloon.

After releasing the balloon, the process 250 proceeds to operation 310 in which the process monitors data received from the sonde. The process continues to monitor the data until it is determined that the flight has been completed in operation 312. When the flight is complete, the process terminates the data log to the data storage device (e.g., disk) in operation 314, readies the system for the next release in operation 316 and returns to the START operation 280.

Although the present invention has been described in conjunction with its preferred embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A balloon launcher comprising:
    a collapsible protective cover comprising a flexible material forming an inner region;
    a gas inlet for receiving a gas;
    a gas outlet for mating with a balloon;
    a valve operable between the gas inlet and the gas outlet for inflating a balloon with the gas within the inner region of the collapsible protective cover;
    a controller adapted to control the valve to inflate the balloon within the protective cover, to open an opening in the protective cover and to release the inflated balloon through the opening in the protective cover, wherein the protective cover comprises an inflatable extender having a volume, the volume being located outside of the balloon, which volume, when inflated, extends the protective cover.

2. The balloon launcher of claim 1, wherein the controller is further adapted to control a second valve to inflate the inflatable extender.

3. The balloon launcher of claim 1, wherein said controller is further adapted to at least partially inflate said protective cover.

4. The balloon launcher of claim 1, wherein said protective cover is provided within in a protective housing.

5. The balloon launcher of claim 1, wherein said protective cover comprises a means for releasably engaging a portion of a balloon.

6. The balloon launcher of claim 5, wherein said means for releasably engaging a portion of a balloon comprises a loop attached to said protective cover for wrapping around a portion of a balloon.

7. The balloon launcher of claim 1, wherein said flexible material comprises a polyethylene material.

8. The balloon launcher of claim 1, wherein said protective cover comprises at least one extender for extending said protective cover from a first configuration to a second configuration.

9. The balloon launcher of claim 8, wherein said first configuration comprises a packed configuration and said second configuration comprises an at least partially extended configuration.

10. The balloon launcher of claim 8, wherein said at least one extender comprises an inflatable extender.

11. The balloon launcher of claim 10, wherein said inflatable extender comprises an inflatable support structure attached to said flexible material of said protective cover.

12. The balloon launcher of claim 11, wherein said protective cover comprises a biasing structure for biasing said protective cover towards said first configuration.

13. The balloon launcher of claim 8, wherein said protective cover further comprises a biasing structure for biasing said protective cover towards said first configuration.

14. The balloon launcher of claim 13, wherein said biasing structure comprises an elastic material for retracting said protective cover.

15. The balloon launcher of claim 1, wherein said protective cover is biased toward a retracted configuration.

16. The balloon launcher of claim 1, wherein the controller is further adapted to control a second valve to inflate the inflatable extender.

17. A balloon launcher comprising:
a fill tube comprising a mandrel for inflating a balloon and a retractable rim;
a switch comprising a fixed first member and a sliding second member having a first configuration for locking a balloon to said mandrel and a second configuration for retracting said rim to release a balloon from said mandrel;
an actuator comprising a first electrical contact connected to said fixed first member of said switch, a second electrical contact connected to said sliding second member of said switch, a meltable wire connecting said first electrical contact to said second electrical contact and a biasing means for biasing said contacts in an outwardly radial direction; and
a controller for controlling the flow of a gas through said mandrel to inflate a balloon and for applying a current to said actuator when the balloon is inflated,
wherein said current melts said meltable wire and said biasing means extends said actuator to change a state of said switch from said first configuration to said second configuration.

18. The balloon launcher of claim 17, wherein the controller is further adapted to at least partially inflate a collapsible protective cover comprising a flexible material, the balloon located within an inner region of the protective cover.

19. The balloon launcher of claim 18, wherein the protective cover is provided within a protective housing and wherein the protective cover comprises a means for releasably engaging a portion of a balloon.

20. The balloon launcher of claim 19, wherein the means for releasably engaging a portion of a balloon comprises a loop attached to the protective cover for wrapping around a portion of a balloon.

21. The balloon launcher of claim 18, wherein the flexible material comprises a polyethylene material.

22. The balloon launcher of claim 18, wherein the protective cover comprises at least one extender for extending the protective cover from a first configuration to a second configuration and wherein the first configuration comprises a packed configuration and the second configuration comprises an at least partially extended configuration.

23. The balloon launcher of claim 22, wherein the at least one extender comprises an inflatable extender.

24. The balloon launcher of claim 23, wherein the inflatable extender comprises an inflatable support structure attached to the flexible material of the protective cover.

25. The balloon launcher of claim 22, wherein the protective cover comprises a biasing structure for biasing the protective cover towards the first configuration.

26. The balloon launcher of claim 22, wherein the biasing structure comprises an elastic material for retracting the protective cover.

27. A method for inflating a balloon comprising:
providing a collapsible protective cover comprising a flexible material forming an inner region;
providing a nozzle comprising an inlet and an outlet;
providing a balloon having an opening, the opening being attached around the outlet of the nozzle and the balloon being located within an inner region of the collapsible protective cover;
providing a flexible tube comprising a first end and a second end, the first end being attached to the outlet of the nozzle inside the opening of the balloon and the second end extending into the a neck of the balloon away from the nozzle;
flowing a gas through the nozzle and flexible tube into the balloon to inflate the balloon within the protective cover, to open an opening in the protective cover, and to release the inflated balloon through the opening in the protective cover, wherein the pressure of the gas maintains the second end of the flexible tube in an open configuration and wherein the protective cover comprises an inflatable extender having a volume, the volume being located outside of the balloon, which volume when inflated extends the protective cover; and
stopping the flow of gas into the balloon, wherein a pressure of the gas within the balloon collapses the second end of the tube preventing gas from flowing out the inlet of the nozzle.

28. A balloon having a one-way fill valve comprising:
a collapsible protective cover comprising a flexible material forming an inner region;
a nozzle comprising an inlet and an outlet;
a balloon having an opening, the opening being attached around the outlet of the nozzle and the balloon being located within an inner region of the collapsible protective cover;
a flexible tube comprising a first end and a second end, the first end being attached to the outlet of the nozzle inside the opening of the balloon and the second end extending into the a neck of the balloon away from the nozzle; and
a controller adapted to control a valve to inflate the balloon within the protective cover, to open an opening in the protective cover and to release the inflated balloon through the opening in the protective cover, wherein the protective cover comprises an inflatable extender having a volume, the volume being located outside of the balloon, which volume, when inflated, extends the protective cover;
wherein pressure applied from a gas entering the flexible tube from the nozzle maintains the second end of the flexible tube in an open configuration when the pressure applied from the gas entering the flexible tube from the nozzle is greater than an interior pressure in the balloon, and
wherein the interior pressure of the balloon collapses the second end of the tube when the interior pressure of the balloon is greater than the pressure applied from a gas entering the flexible tube from the nozzle is less than the interior pressure of the balloon.

* * * * *